United States Patent
Bilodeau et al.

(10) Patent No.: US 8,152,484 B2
(45) Date of Patent: Apr. 10, 2012

(54) ENGINE COOLING FAN ASSEMBLY

(75) Inventors: Mark L. Bilodeau, Burlington, MA (US); Frederick R. Cote, Dover, MA (US); Alex Czulak, Wayland, MA (US)

(73) Assignee: Robert Bosch GmbH, Stuttgart (DE)

( * ) Notice: Subject to any disclaimer, the term of this patent is extended or adjusted under 35 U.S.C. 154(b) by 367 days.

(21) Appl. No.: 12/421,205

(22) Filed: Apr. 9, 2009

(65) Prior Publication Data
US 2010/0260630 A1 Oct. 14, 2010

(51) Int. Cl.
F04B 17/00 (2006.01)
A47C 7/74 (2006.01)
A47C 21/04 (2006.01)
B63H 7/00 (2006.01)
F04D 29/64 (2006.01)

(52) U.S. Cl. ............ 417/319; 417/360; 416/170 R; 416/169 A; 416/244 R

(58) Field of Classification Search .......... 415/216.1; 416/169 A, 180, 189, 193 R, 244 A, 244 R, 416/170 R; 417/319, 423.6, 352, 353, 354, 417/360, 423.15, 424.1; 123/41.49; 403/329, 403/397
See application file for complete search history.

(56) References Cited

U.S. PATENT DOCUMENTS

| 2,819,703 | A |   | 1/1958 | Suttle |
| 3,367,687 | A |   | 2/1968 | Jenkins |
| 4,009,970 | A |   | 3/1977 | Forth, Jr. |
| 4,189,284 | A |   | 2/1980 | Cummins |
| 4,197,054 | A | * | 4/1980 | Morrill ............. 416/93 R |
| 4,605,355 | A |   | 8/1986 | Davis et al. |
| 5,871,335 | A |   | 2/1999 | Bartlett |
| 6,206,639 | B1 |   | 3/2001 | Light et al. |
| 6,428,277 | B1 | * | 8/2002 | Holmes ............. 416/192 |
| 6,527,516 | B2 | * | 3/2003 | Crevel ............. 416/204 R |
| 6,579,063 | B2 | * | 6/2003 | Stairs et al. ........ 416/169 A |
| 6,784,586 | B2 |   | 8/2004 | Akemakou |

FOREIGN PATENT DOCUMENTS

EP 0444906 9/1991

OTHER PUBLICATIONS

Applicants' admitted prior art, Exhibits A-C.*
Admitted prior art, Exhibit A, 1 page, and Statement of Relevance.
Admitted prior art, Exhibit B, 1 page, and Statement of Relevance.
Admitted prior art, Exhibit C, 1 page, and Statement of Relevance.

* cited by examiner

*Primary Examiner* — Devon C Kramer
*Assistant Examiner* — Bryan Lettman
(74) *Attorney, Agent, or Firm* — Michael Best Friedrich LLP

(57) ABSTRACT

A fan assembly that includes a fan having a fan hub and motor having a drive shaft and a drive member coupled to the drive shaft for rotation with the drive shaft. The fan hub includes an inner face and an outer face. The drive member contacts the inner face of the fan hub to define a plurality of discrete drive member contact zones between the drive member and the inner face of the fan hub. A clip engages the drive shaft and the outer face of the fan hub to couple the fan to the drive shaft. The clip contacts the outer face of the fan hub to define a plurality of discrete clip contact zones between the clip and the outer face of the fan hub. The plurality of drive member contact zones are generally aligned with the plurality of clip contact zones.

20 Claims, 9 Drawing Sheets

ENGINE COOLING FAN ASSEMBLY

BACKGROUND

The present invention relates to fans, and more particularly to engine cooling fans.

Engine cooling fan assemblies, particularly those utilized in automobiles, often include a shroud, an electric motor, and a fan. The shroud typically includes a shroud hub or motor mount and stationary blades that extend radially from the shroud hub. The motor is often received by the shroud hub and secured to the shroud using fasteners. A drive shaft can extend from the motor and the motor drive shaft typically includes a drive member that couples the drive shaft and the fan for co-rotation. A clip can be attached to an end of the motor drive shaft to secure the fan to the motor drive shaft.

SUMMARY

In one embodiment, the invention provides a fan assembly that includes a motor having a drive shaft and a fan that includes a fan hub having an aperture through which the drive shaft extends. The fan hub further includes an inner face that faces toward the motor and an outer face that faces away from the motor. The fan further includes a plurality of fan blades that extend radially from the fan hub. A drive member is coupled to the drive shaft for rotation with the drive shaft, and the drive member contacts the inner face of the fan hub to define a plurality of discrete drive member contact zones between the drive member and the inner face of the fan hub. The drive member applies a pressure to the inner face of the fan hub at the drive member contact zones to inhibit movement of the fan along the drive shaft. A clip engages the drive shaft and the outer face of the fan hub to couple the fan to the drive shaft. The clip contacts the outer face of the fan hub to define a plurality of discrete clip contact zones between the clip and the outer face of the fan hub. The clip applies a pressure to the outer face of the fan hub at the clip contact zones to inhibit movement of the fan along the drive shaft. The plurality of drive member contact zones are generally aligned with the plurality of clip contact zones.

In another embodiment, the invention provides a fan assembly that includes a motor having a drive shaft and a fan that includes a fan hub having an aperture through which the drive shaft extends. The fan hub further includes an inner face that faces toward the motor and an outer face that faces away from the motor. The fan further includes a plurality of fan blades that extend radially from the fan hub. A drive member is coupled to the drive shaft for rotation with the drive shaft. The drive member applies a pressure to the inner face to inhibit movement of the fan along the drive shaft. The assembly further includes a clip having a first radial edge, a second radial edge, and a groove at least partially defined between the first and the second radial edges. The groove receives the drive shaft to engage the clip and the outer face of the fan hub to couple the fan to the drive shaft. The clip contacts the outer face of the fan hub to define a clip contact zone between the clip and the outer face of the fan hub. The clip applies a pressure to the outer face of the fan hub at the clip contact zone to inhibit movement of the fan along the drive shaft, and there is no clip contact zone directly adjacent either one of the first radial edge and the second radial edge of the clip.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
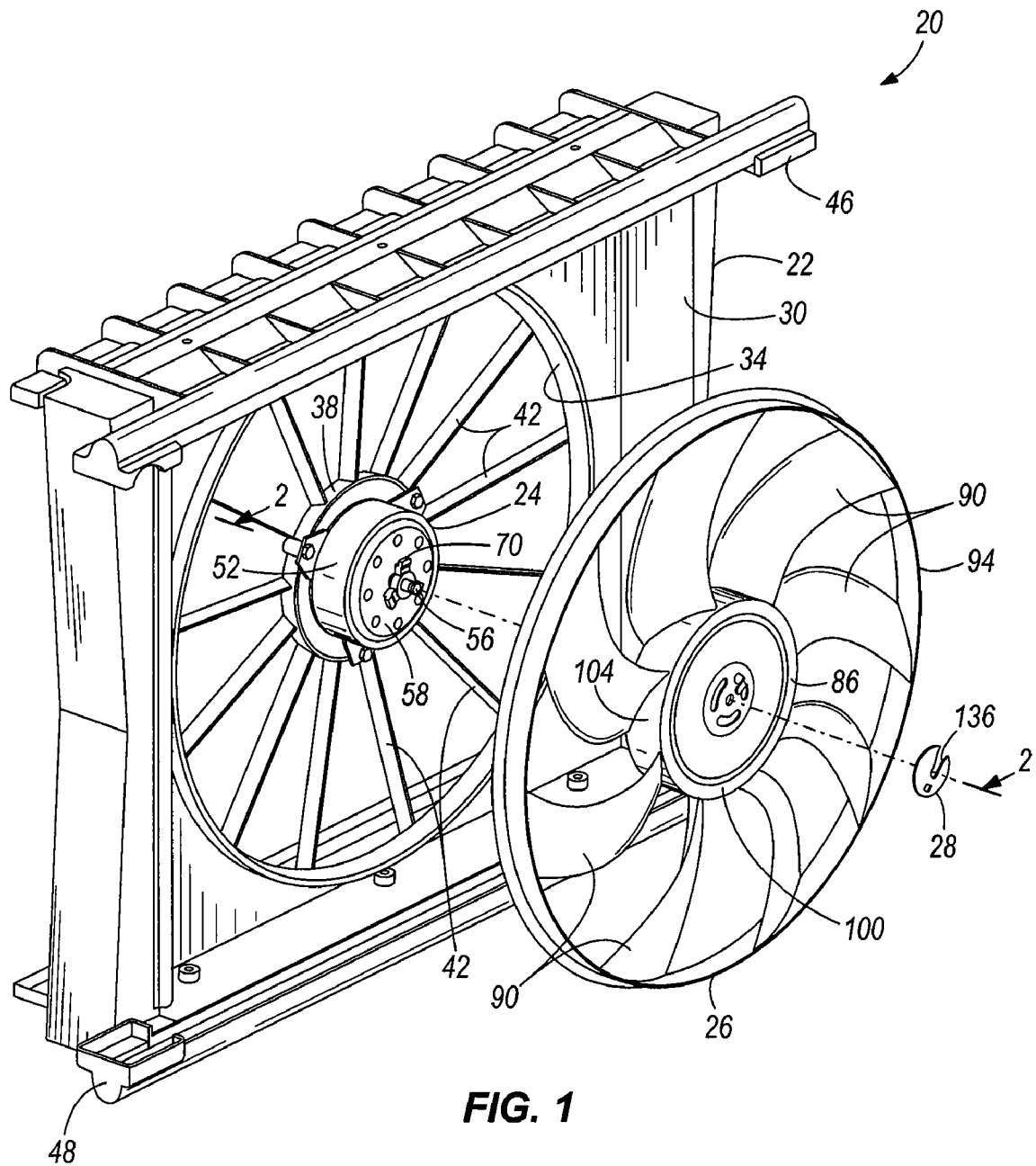
FIG. 1 is an exploded perspective view of a fan assembly in one embodiment of the invention.

FIG. 1 illustrates a fan assembly 20 that includes a shroud 22, a motor 24, a fan 26, and a clip 28 that couples the fan 26 to the motor 24. The shroud 22 includes a body portion 30 that defines a circular intake plenum 34. A shroud hub or motor mount 38 is located at the center of the plenum 34. Stationary blades 42 extend radially from the shroud hub 38 to couple the shroud hub 38 to the body portion 30 within the intake plenum 34. The illustrated shroud 22 further includes upper and lower brackets 46 and 48, respectively, which can be utilized to couple a heat exchanger to the shroud 26. Accordingly, in one embodiment, the fan assembly 20 is an automotive cooling fan assembly.

Figure 7:
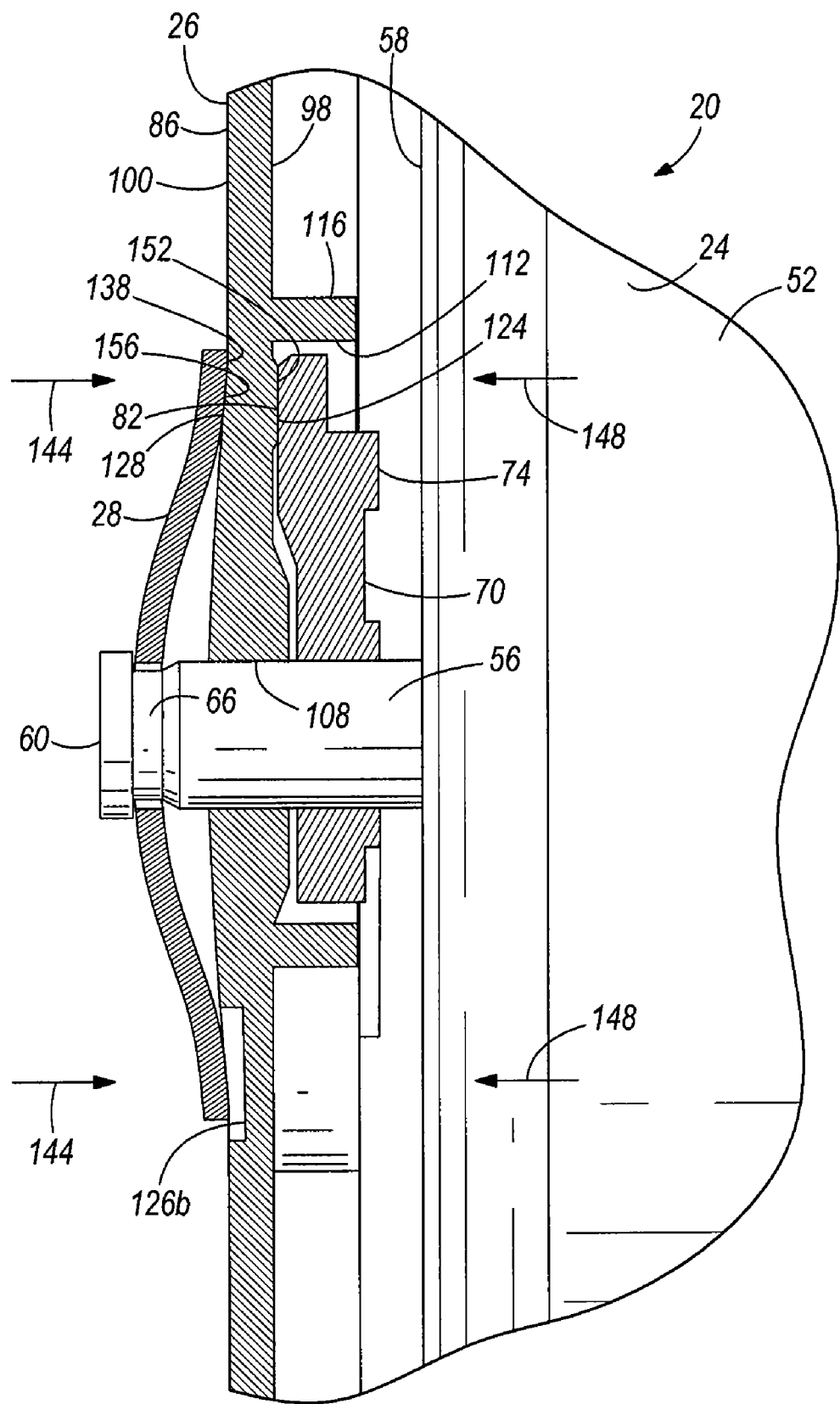
FIG. 7 is an enlarged view of a portion of FIG. 2.

The electric motor 24 includes a housing 52 and a drive shaft 56 that extends out from an end 58 of the housing 52. Referring to FIGS. 1 and 7, the drive shaft 56 includes an end 60 located outside of the housing 52. A circumferential groove 66 is formed in the drive shaft 56 adjacent the end 60. A drive member 70 is coupled to the drive shaft 56 for rotation with the drive shaft 56 between the groove 66 of the drive shaft 56 and the end 58 of the motor housing 52. As will be discussed in more detail below, the drive member 70 couples the motor drive shaft 56 to the fan 26 for co-rotation.

Figure 11:
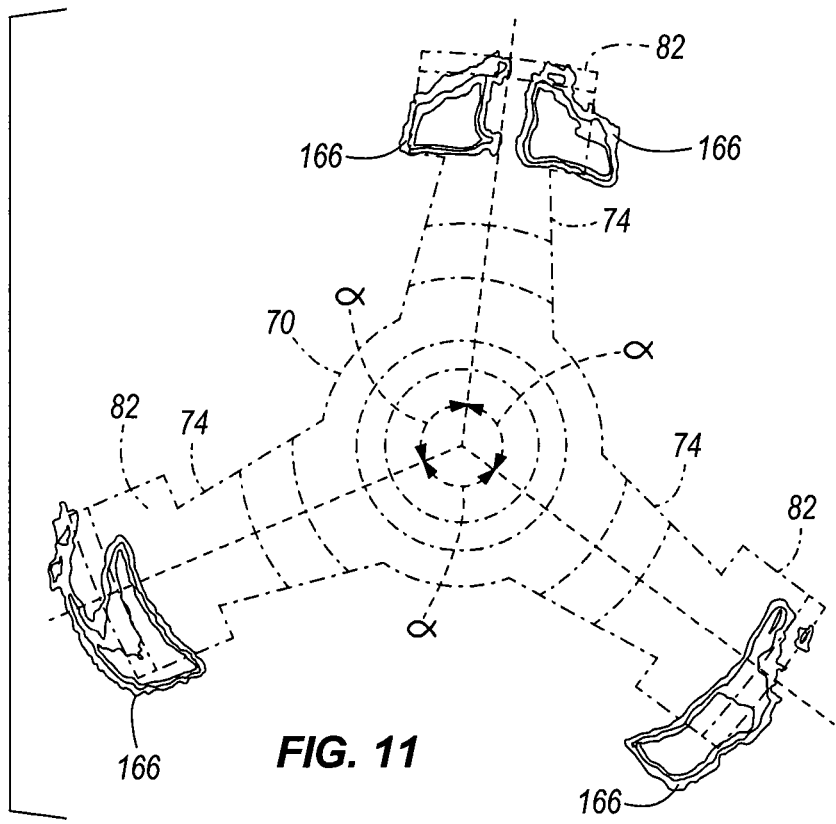
FIG. 11 is a representation of clip pressure applied to the drive member in one embodiment of the cooling fan assembly of the invention.

As best seen in FIGS. 1, 7, and 11, in the illustrated construction, the drive member 70 includes three arms 74 that extend radially from the drive shaft 56 when the drive member 70 is coupled to the drive shaft 56. The three arms 74 are arranged substantially symmetrical about the drive shaft 56 such than an angle α of about 120 degrees is defined between centerlines 76 of the arms 74. The end of each of the arms 74 forms an enlarged pad 82. As seen in the cross-sectional view of FIG. 7, the pads 82 stand above or proud of the remainder of the arm 74 in a direction toward the clip 28. It should be understood that the drive member 70 illustrated and described herein is just one possible construction. In other embodiments, the drive member can have more or less than three arms and may take other suitable shapes.

Figure 3:
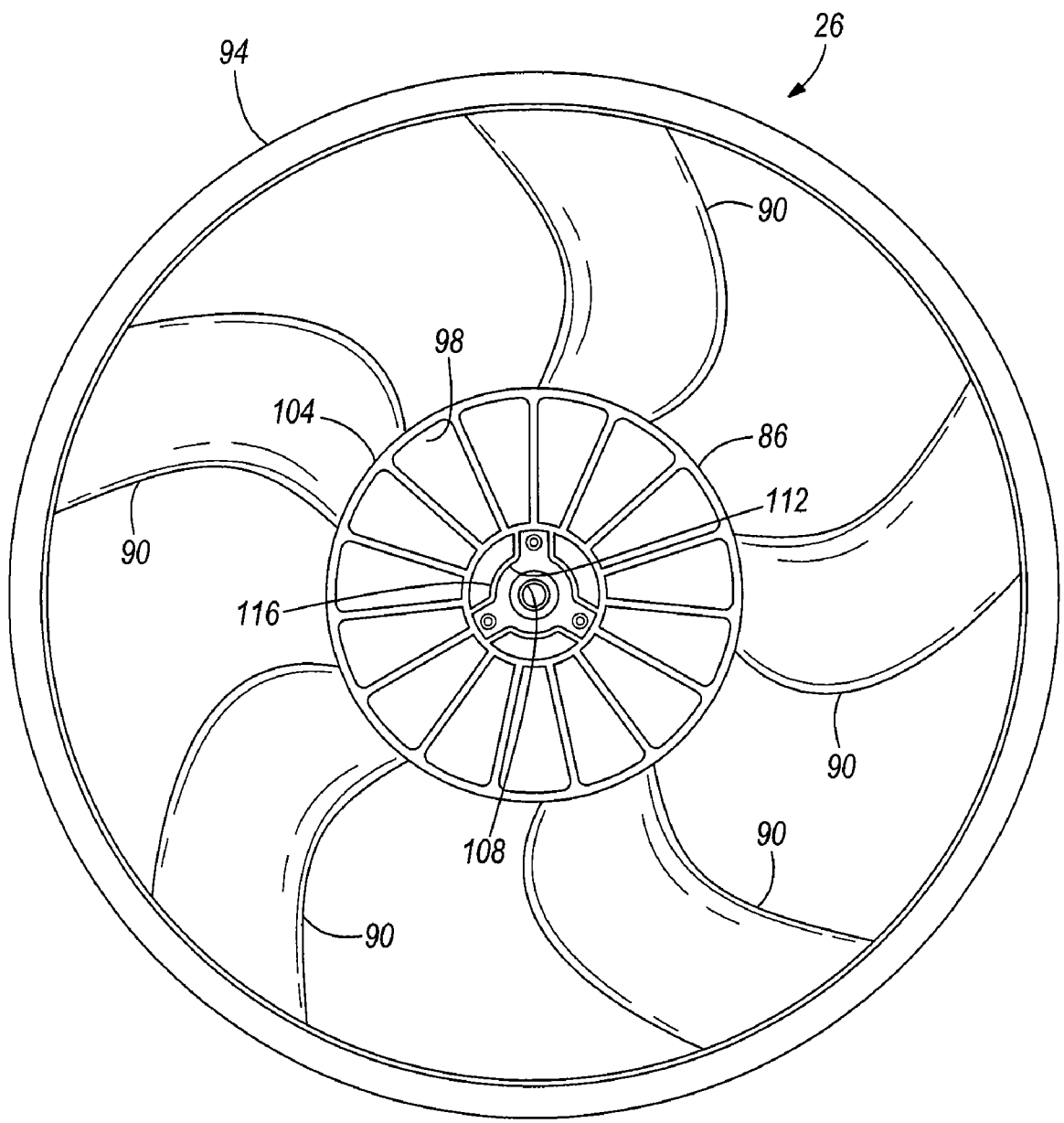
FIG. 3 is a rear side view of a fan of the fan assembly of FIG. 1.
Figure 4:
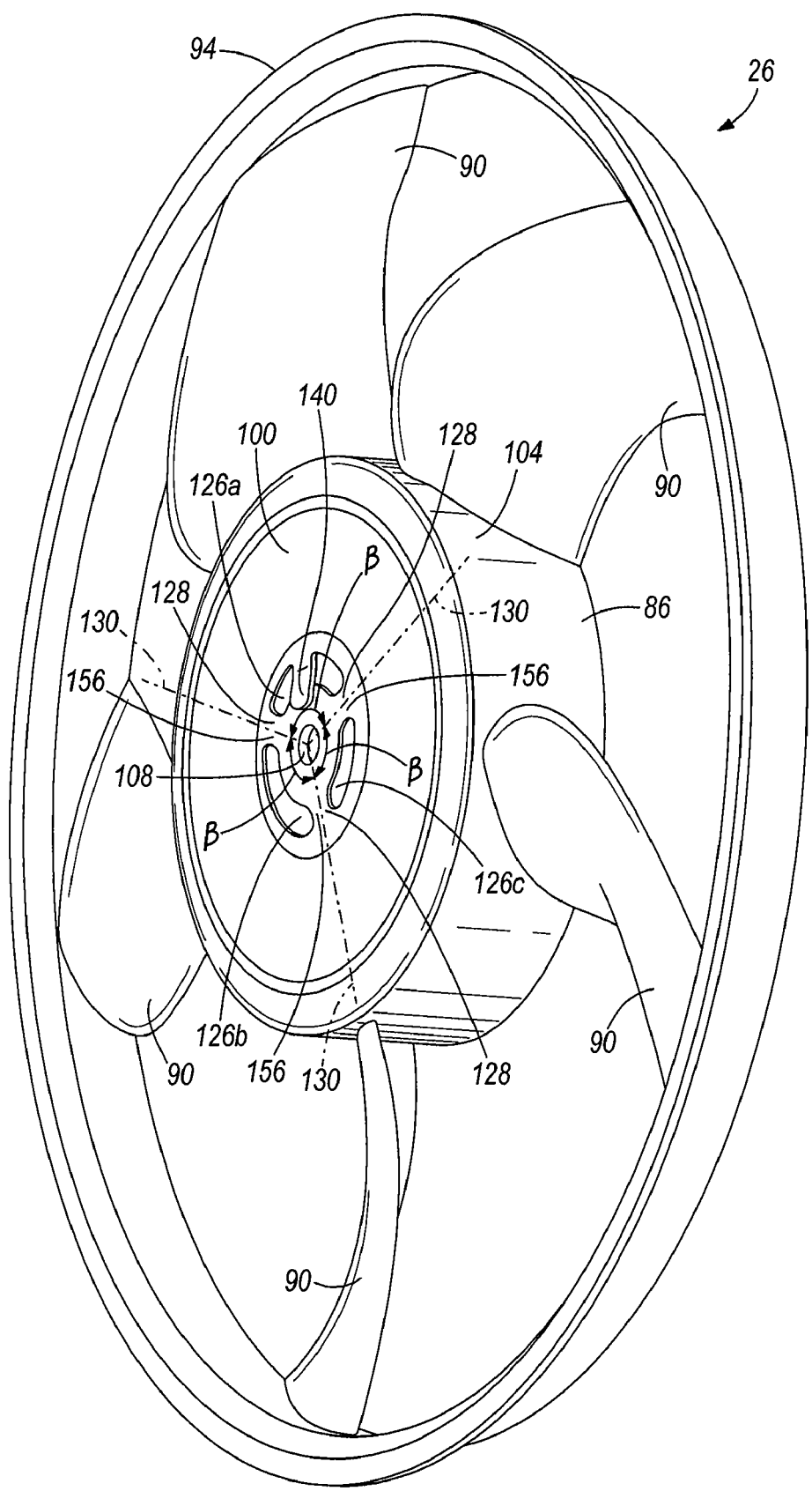
FIG. 4 is a front perspective view of the fan of the fan assembly of FIG. 1.

Referring to FIGS. 1, 3, and 4, the fan 26 includes a fan hub 86 and fan blades 90 that extend radially from the fan hub 86. The illustrated fan 26 includes an outer band 94 that connects tips of the fan blades 90 to provide additional structural support to the fan 26. The fan hub 86 includes an inner face 98, an outer face 100, and a wall 104 that extends around the periphery of the faces 98 and 100 and to which the fan blades 90 are coupled. An aperture 108 extends through the center of the fan hub 86 from the inner face 98 to the outer face 100.

Figure 8:
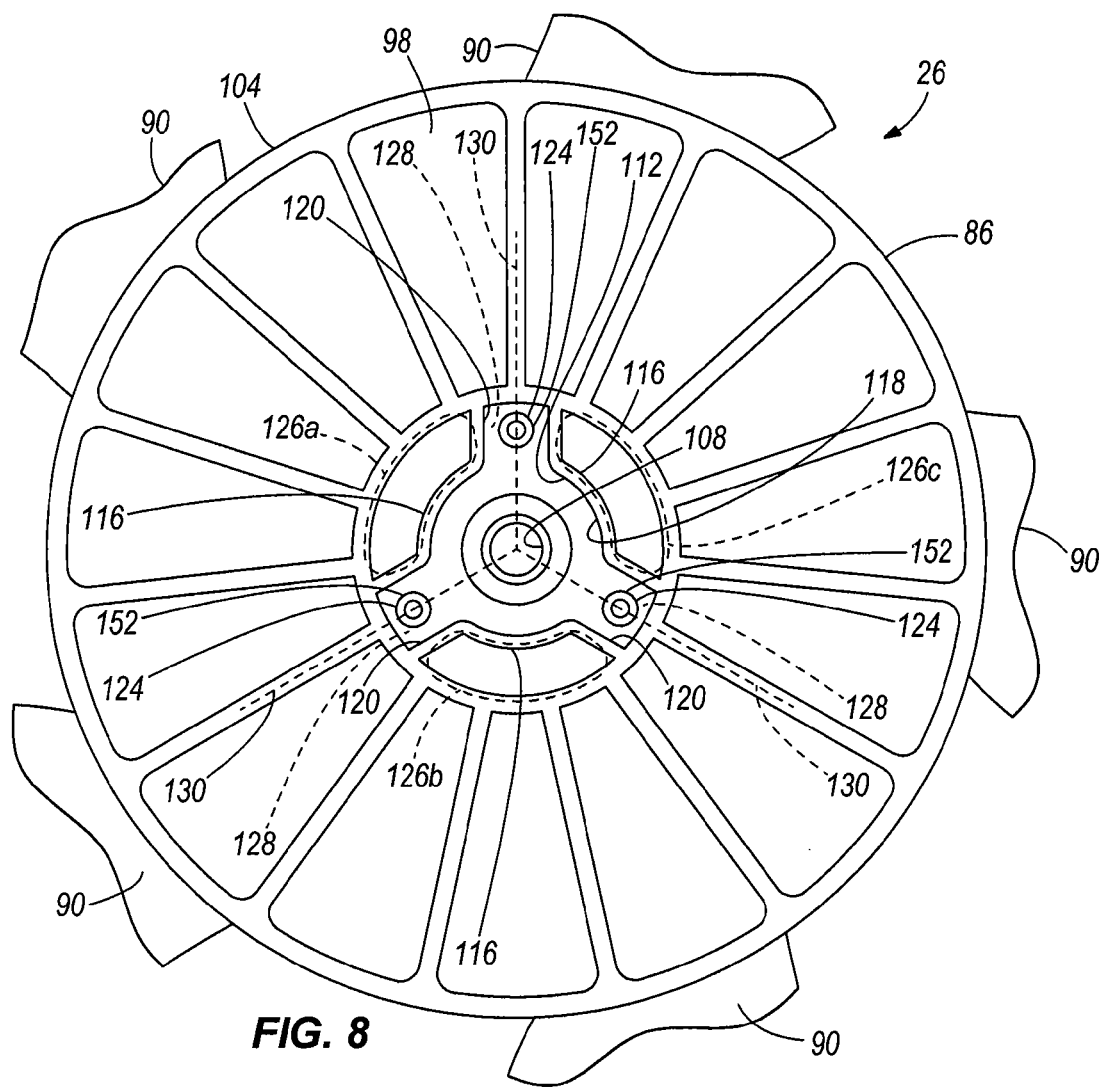
FIG. 8 is an enlarged view of a portion of FIG. 3.

Referring to FIG. 8, a recess 112 is formed on the inner face 98 of the fan hub 86 such that the aperture 108 is located at the center of the recess 112. The recess 112 is defined by the inner face 98 and a plurality of walls 116 that extend from the inner face 98. The walls 116 of the recess 112 define a shape of the recess 112 that, when viewed from the position of FIG. 8, has a generally circular center portion 118 and arm portions 120 that extend radially from the generally circular center portion 118. As best seen in FIGS. 7 and 8, the inner face 98 further includes raised projections 124 at the center of each of the arm portions 120. While the illustrated embodiment includes the raised projections 124, in other embodiments, the raised projection 124 can be omitted.

Referring to FIG. 4, the outer face 100 of the fan hub 86 includes discrete recesses 126a, 126b, and 126c formed in the outer face 100. The illustrated three recesses 126a, 126b, and 126c are formed generally symmetrically around the central aperture 108 of the fan hub 86 and the recesses 126a, 126b, and 126c define three pads 128 located between the recesses 126a, 126b, and 126c. The recesses 126a, 126b, and 126c are formed generally symmetrically around the aperture 108 such that the pads 128 define centerlines 130 that extend through the center of each pad 128 and intersect at the center of the aperture 108. An angle β of about 120 degrees is defined between adjacent centerlines 130. Also, the recesses 126a, 126b, and 126c are located the same radial distance from the aperture 108 so that the pads 128 are also located the same radial distance from the aperture 108. The recesses 126a, 126b, and 126c can be formed in the outer face 100 of the fan hub 86 by milling, machining, molding, and the like. Furthermore, while the illustrated embodiment includes three pads 128 formed by three generally kidney-shaped or arcuate recesses 126a, 126b, and 126c, in other embodiments, the outer face 100 can include other suitable numbers and configurations of pads and recesses. For example, in one construction, the fan may omit the recesses 126b and 126c of FIG. 4 and include only the recess 126a.

Figure 5:
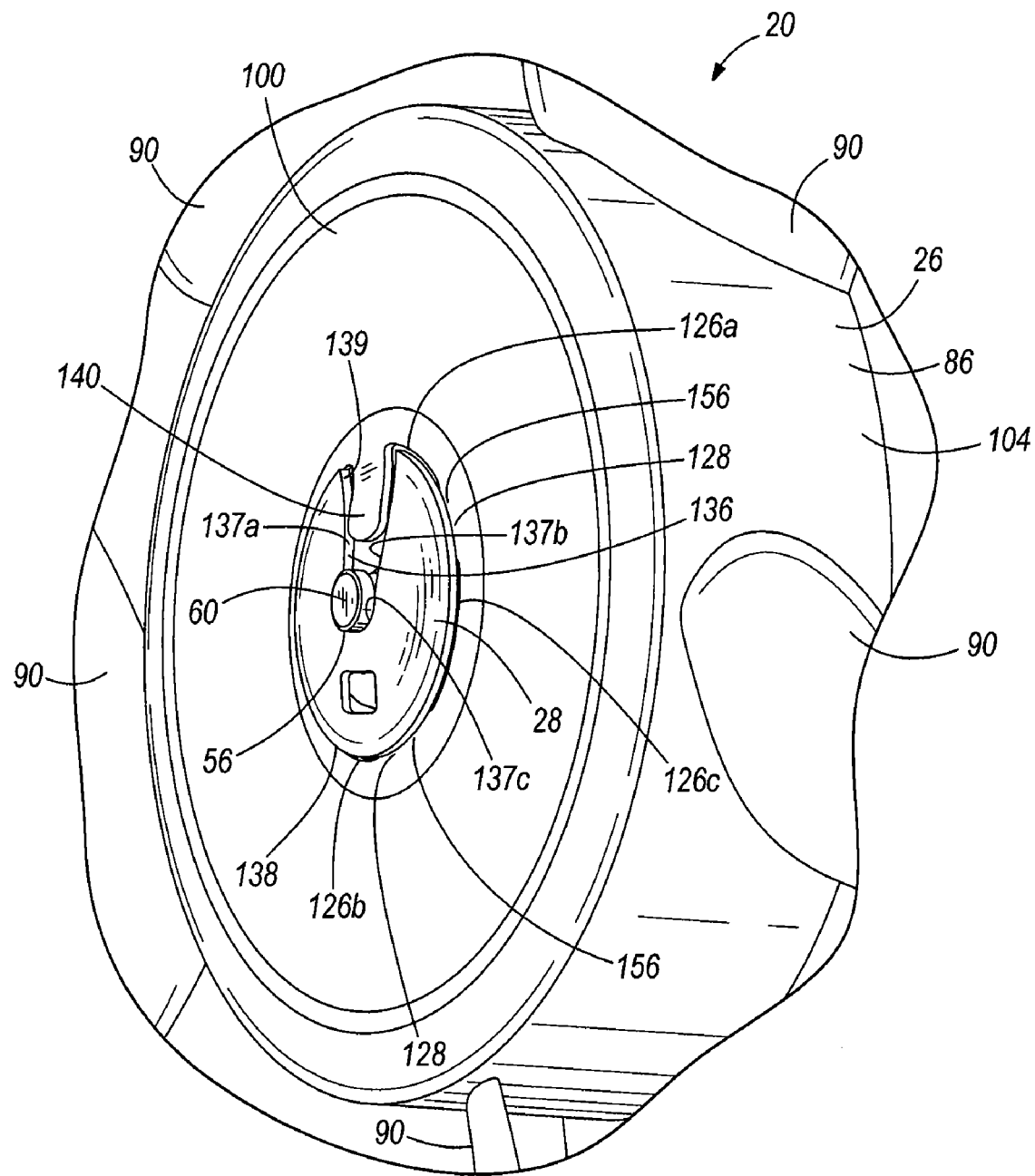
FIG. 5 is an enlarged front perspective view of a portion of the assembled fan assembly of FIG. 1.

Referring to FIG. 5, the clip 28 is generally circular and includes a groove 136 that extends radially from the center of the clip 28 to the outer circumference of the clip 28. The groove 136 is defined by a first radial edge 137a, a second radial edge 137b, and a generally circular end portion 137c at the inner end of the edges 137a and 137b. The circular portion 137c is concentric with the clip 28, and the edges 137a and 137b extend from the circular portion 137c to an outer periphery 138 of the clip 28 such that the groove 136 defines an opening 139 in the outer periphery 138 of the clip. While the edges 137a and 137b are described as radial edges, it should be understood that the term radial as used herein is not limited to edges that extend from the center of the clip 28 in a perfectly radial direction. Rather, radial, as used herein is meant to also include edges extending generally in a radial direction or from a point near the center of the clip generally toward the periphery of the clip. As best seen in FIG. 7, the clip 28 has a concave profile in order to apply pressure to the fan 26 at the outer periphery 138 of the clip 28, as will be discussed in more detail below.

Figure 2:
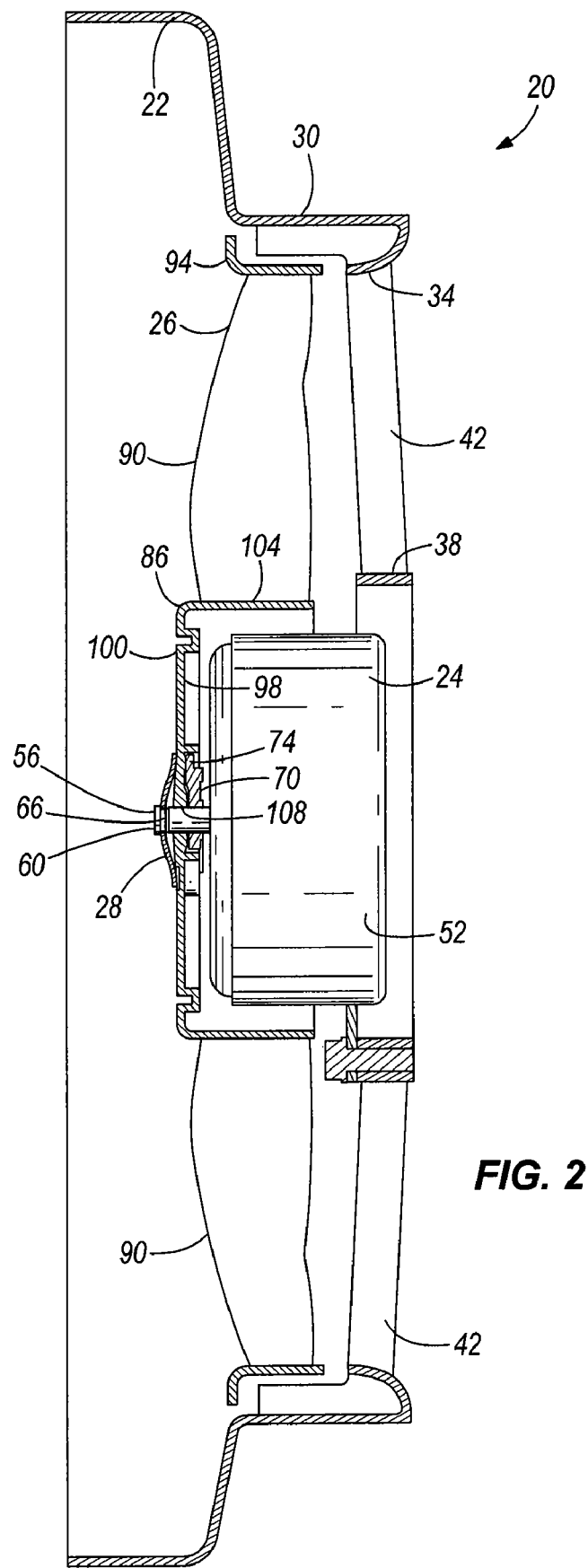
FIG. 2 is a partial cross-sectional view of the fan assembly of FIG. 1 assembled and taken along line 2-2 of FIG. 1.

Referring to FIGS. 2 and 7, the fan 26 is coupled to the motor 24 by placing the drive shaft 56 of the motor 24 through the central aperture 108 of the fan hub 86 such that the inner face 98 faces toward the motor 24 and the outer face 100 faces away from the motor 24. The fan 26 is orientated rotationally with respect to the shaft 56 and the drive member 70 such that the drive member 70 of the motor 24 is received in the recess 112 of the inner face 98 (see also FIGS. 8 and 11). Accordingly, each arm 74 of the drive member 70 is received in one of the arm portions 120 of the recess 112 thereby coupling the motor drive shaft 56 for rotation with the fan 26.

Referring to FIGS. 5 and 7, next, the clip 28 is placed on the motor drive shaft 56 such that the groove 66 in the shaft 56 is received in the circular portion 137c at the end of the clip groove 136 and the clip groove 136 receives an alignment member 140 of the fan hub 86. Because of the concave shape of the clip 28, the clip 28 applies pressure to the outer face 100 of the fan hub 86 generally in the direction indicated by arrows 144 of FIG. 7. In response, the drive member 70, which is fixed from movement along the drive shaft 56, applies pressure to the inner face 98 of the fan hub 86 generally in the direction indicated by arrows 148 of FIG. 7. Together, the clip 28 and the drive member 70 inhibit movement of the fan 26 along the drive shaft 56.

Referring to FIGS. 7 and 8, the drive member 70 engages or contacts the inner face 98 of the fan hub 86 to define discrete or distinct contact zones 152. The contact zones 152 are the locations on the inner face 98 of the fan hub 86 where the drive member 70 applies pressure to the fan hub 86 represented by the arrows 148. In the illustrated construction, the drive member 70 creates the three discrete contacts zones 152 because the drive member 70 includes the three arms 74 and three pads 82 (FIG. 11). Furthermore, in the illustrated construction, the inner face 98 includes the projections 124 such that the drive member contact zones 152 are generally formed on the projections 124 as best seen in FIG. 7.

Meanwhile, the clip 28 contacts or engages the outer face 100 of the fan hub 86 to define discrete or distinct clip contact zones 156. The clip contact zones 156 are the locations on the outer face 100 of the fan hub 86 where the clip 28 applies pressure to the outer face 100 of the fan hub 86 represented by the arrows 144. Because of the concave shape of the clip 28, the clip 28 only applies pressure to the outer face 100 around the periphery 138 of the clip 28. Furthermore, because of the recesses 126a, 126b, and 126c formed in the outer face 100, which align with the periphery 138 of the clip 28 when the clip 28 is attached to the shaft 56, the clip 28 only applies the pressure, represented by arrows 144, at the pads 128. In the illustrated construction, the clip contact zones 156 are formed only on the pads 128.

Referring to FIG. 8, the projections 124 of the inner face 98 are aligned with the pads 128 of the outer face 100. Accordingly, the drive member contact zones 152 are aligned with the clip contact zones 156. The drive member contact zones 152 are aligned with the clip contact zones 156 such that both contact zones 152 and 156 are located approximately the same radial distance from the aperture 108, and the drive member contact zones 152 are centrally located circumferentially between adjacent recesses 126a, 126b, and 126c of the outer face 100. Accordingly, each one of the clip contact zones 156 is directly opposed (in an axial direction with respect to the drive shaft 56) to a respective drive member contact zone 152. It should be understood that the contact zones 152 and 156 are generally aligned and directly opposed and yet the clip contact zones 156 extend beyond (in both radial and circumferential directions with respect to the drive shaft 56) their respective or opposed drive member contact zones 152 as illustrated in FIG. 8. In other embodiments the contact zones can be generally aligned and directly opposed and yet the drive member contact zones extend beyond (in both radial and circumferential directions with respect to the drive shaft 56) the opposed or respective clip contact zones. In yet other embodiments, the contact zones can be generally aligned and directly opposed without any overlap between the contact zones.

In embodiments that omit the projections 124, the drive member contact zones are defined by the pads 82 of the drive member arms 74 (FIG. 11). The pads 82 are similarly aligned with the pads 128 of the outer face 100 such that the drive member contact zones and clip contact zones would be aligned.

Figure 10:
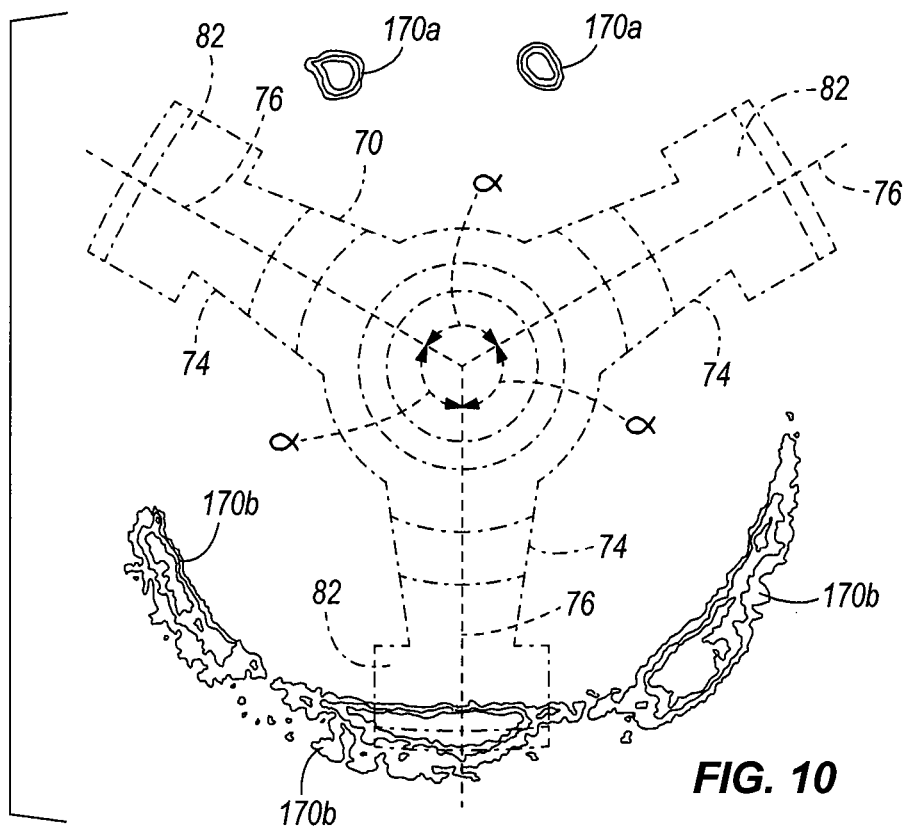
FIG. 10 is a representation of clip pressure applied to a drive member in prior art fan assemblies.

During operation of the fan assembly 20, it has been found that the alignment of the clip contact zones 156 with the drive member contact zones 152 reduces bending moments that cause distortion of the shape of the fan 26, especially when the fan 26 is exposed to relatively high temperatures. Referring to FIGS. 8 and 11, aligning the contact zones 152 and 156 directs the pressure from the clip 28 to the pads 82 of the drive member 70 and minimizes the amount of pressure that is applied by the clip 28 to areas between the pads 82, which reduces the bending moments. FIG. 11 illustrates pressure areas 166 that are applied to the pads 82 of the drive member arms 74 when the contact zones 152 and 156 are aligned. As illustrated, aligning the contact zones 152 and 156 concentrates the pressure areas 166 on the pads 82, which reduces bending moments and distortion of the shape of the fan 26. FIG. 10 illustrates the application of pressure (represented by areas 170a and 170b) in a prior art fan assembly that does not include the recesses 126a, 126b, and 126c (FIG. 4) or aligned drive member contact zones and clip contact zones. In such a construction, the clip 28 unevenly applies pressure around the periphery 138 of the clip 28 (pressure areas 170a and 170b), which can cause undesirable bending moments and distortion of the shape of the fan during operation. Particularly, the pressure areas 170a that are created adjacent edges 137a and 137b of the clip 28 (FIG. 5) can create undesirable bending moments and distort the shape of the fan.

Referring to FIG. 5, the alignment member 140, which is located generally at the center of the recesses 126a, positions the clip 28 with respect to the outer face 100 of the fan hub 86. The clip 28 is positioned such that the radial edges 137a and 137b at the outer periphery 138 of the clip 28 are axially or opposed to the recess 126a. Accordingly, the clip 28 does not apply pressure to the outer face 100 of the fan hub 86 directly adjacent the first and second radial edges 137a and 137b of the clip 28. Rather, the clip 28 applies pressure to the fan hub 86 at the pads 128 and there is no clip contact zone directly adjacent the first and second radial edges 137a and 137b. As seen in FIGS. 4 and 5, the respective contact zone 156 that is closest to the edge 137a or 137b is about 50 degrees from the nearest edge 137a or 137b such that there is no contact zone within about 50 degrees of either the edge 137a or the edge 137b. In other constructions, there may be no contact zone within about 25 degrees of either the edge 137a or the edge 137b. It has been found that pressure areas 170a (FIG. 10) are created adjacent edges 137a and 137b when there are clip contact zones adjacent edges 137a and 137b. In the illustrated construction, where there are no clip contact zones directly adjacent the edges 137a and 137b pressure areas are not created adjacent edges 137a and 137b and the pressure areas 166 can be applied to the pads 82 as illustrated in FIG. 11.

Figure 6:
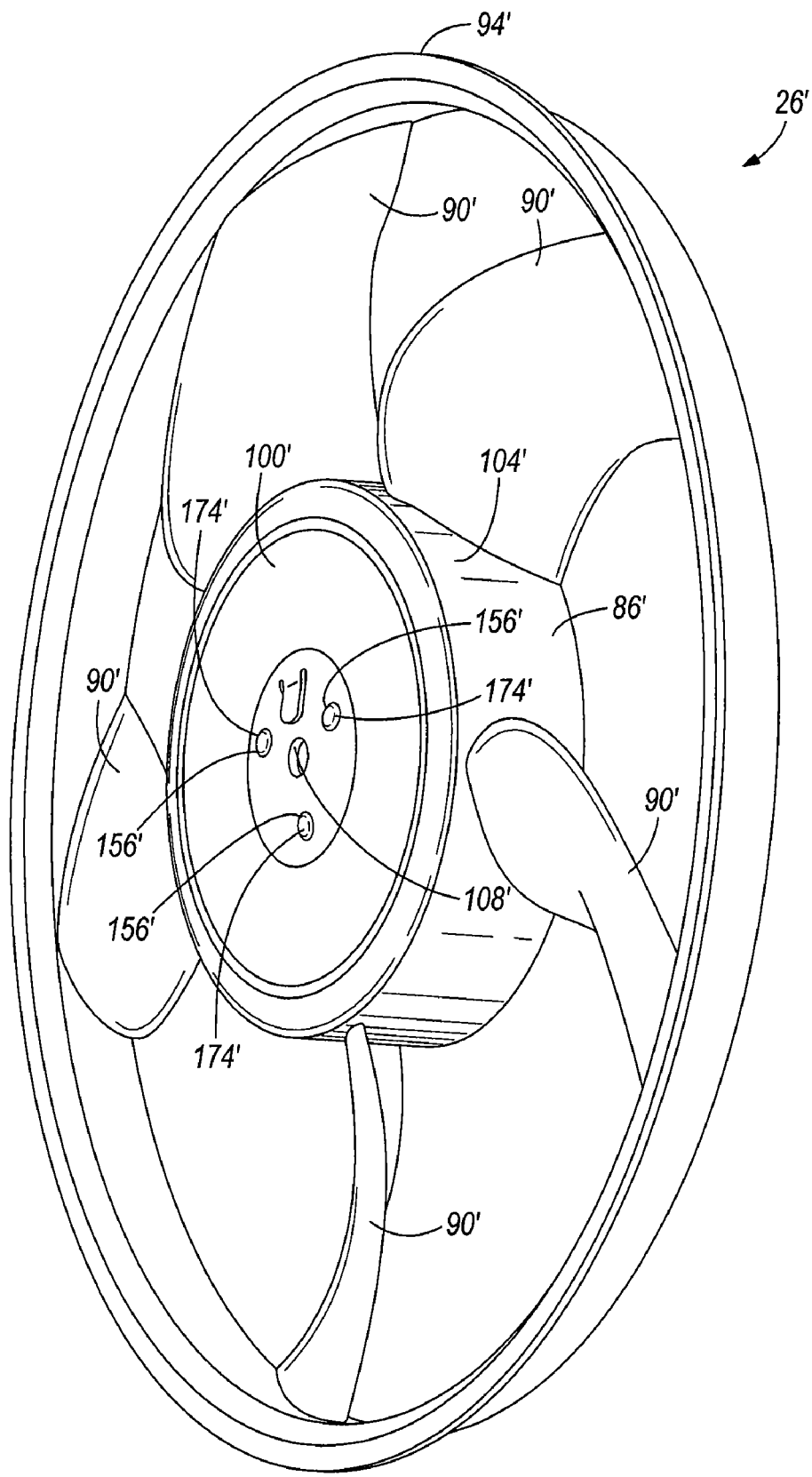
FIG. 6 is a front perspective view of a fan in a second embodiment of the invention.

FIG. 6 illustrates an alternative construction of the fan 26. The fan 26' of FIG. 6 is substantially the same as the fan 26 and like components have been given like reference numbers with the addition of a prime symbol and only the differences will be discussed. In the embodiment illustrated in FIG. 6, the clip contact zones 156' are defined by raised projections 174' of the outer face 100' of the fan hub 86' rather than by the pads 128 of FIG. 4.

Figure 9A:
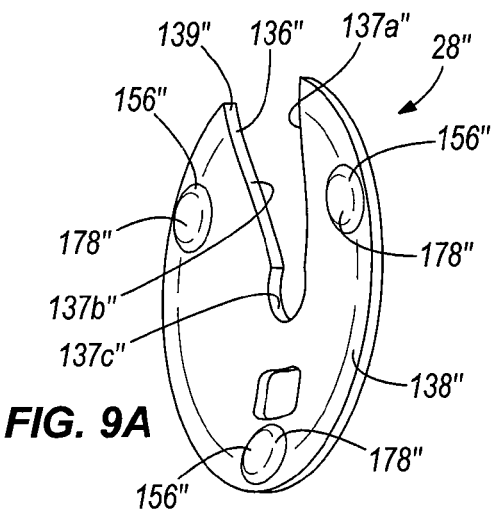
FIG. 9a is a rear perspective view of a clip in a third embodiment of the invention.

Likewise, FIG. 9a illustrates an alternative construction of the clip 28. The clip 28" of FIG. 9a is substantially the same as the clip 28 and like components have been given like reference numbers with the addition of a double prime symbol and only the differences will be discussed. In the embodiment illustrated in FIG. 9a, the clip contact zones 156" are defined by a plurality of raised projections 178" on the clip 28" rather than or in addition to the pads 128 of FIG. 4 or the projections 174' of FIG. 6.

Figure 9B:
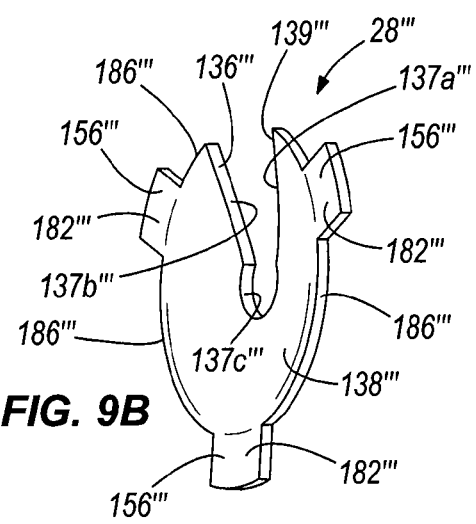
FIG. 9b is a rear perspective view of a clip in a fourth embodiment of the invention.

FIG. 9b illustrates yet another alternative construction of the clip 28. The clip 28''' of FIG. 9b is substantially the same as the clip 28 and like components have been give like reference numbers with the addition of a triple prime symbol and only the differences will be discussed. In the embodiment illustrated in FIG. 9b, the clip contact zones 156''' are defined by pads 182''' located between recesses 186''' formed in the clip 28''' rather than or in addition to the pads 128 of FIG. 4, the projections 174' of FIG. 6, or the projections 178" of FIG. 9a. In other embodiments, the pads 182''' of FIG. 9a can be formed by removing some, but not all, of the material around and between the pads 182''' such that recesses are formed and the outer periphery of the clip has a shape similar to the shape of the clip 28" of FIG. 9A. Yet other embodiments may include any suitable combination of the features of the various embodiments specifically described and illustrated herein.

Various features and advantages of the invention are set forth in the following claims.

What is claimed is:
1. A fan assembly comprising:
a motor including a drive shaft;
a fan including,
a fan hub having an aperture through which the drive shaft extends, an inner face that faces toward the motor, and an outer face that faces away from the motor, and
a plurality of fan blades that extend radially from the fan hub,
a drive member coupled to the drive shaft for rotation with the drive shaft, the drive member contacting the inner face of the fan hub to define a plurality of discrete drive member contact zones between the drive member and the inner face of the fan hub, the drive member applying a first pressure to the inner face of the fan hub at the drive member contact zones to inhibit movement of the fan along the drive shaft; and
a clip that engages the drive shaft and the outer face of the fan hub to couple the fan to the drive shaft, the clip contacting the outer face of the fan hub to define a plurality of discrete clip contact zones between the clip and the outer face of the fan hub, the clip applying a second pressure to the outer face of the fan hub at the clip contact zones to inhibit movement of the fan along the drive shaft, and wherein the plurality of drive member contact zones are generally aligned with the plurality of clip contact zones.

2. The fan assembly of claim 1, wherein each one of the plurality of the clip contact zones is directly opposed to a respective one of the plurality of drive member contact zones.

3. The fan assembly of claim 1, wherein the plurality of discrete drive member contact zones includes three three discrete drive member contact zones and the plurality of discrete clip contact zones includes discrete clip contact zones, and wherein each one of the three drive member contacts zones is directly opposed to a respective one of the three clip contact zones.

4. The fan assembly of claim 1, wherein the drive member includes a plurality of arms that extend radially from the drive shaft, wherein the fan hub includes a recess at least partially formed from the inner face of the fan hub, wherein the plurality of arms are received in the recess to couple the fan to the drive shaft for co-rotation, and wherein each one of the plurality of drive member contact zones is defined where one of the plurality of the arms contacts the inner face of the fan hub.

5. The fan assembly of claim 4, wherein the plurality of arms includes three arms, each arm defining a respective drive member contact zone where the arm contacts the inner face of the fan hub, wherein the recess of the fan hub includes three corresponding arm portions to couple the fan to the drive shaft for co-rotation, wherein the plurality of discrete clip contact zones includes three discrete clip contact zones, and wherein each of the three clip contacts zones is directly opposed to one of the three drive member contact zones.

6. The fan assembly of claim 1, wherein the plurality of clip contact zones are defined by a plurality of raised projections of the outer face of the fan hub.

7. The fan assembly of claim 1, wherein the plurality of clip contact zones are defined between a plurality of recessed portions formed in the outer face of the fan hub.

8. The fan assembly of claim 1, wherein the plurality of clip contact zones are defined between a plurality of recessed portions formed in the clip.

9. The fan assembly of claim 1, wherein the plurality of clip contact zones are defined by a plurality of raised projections of the clip.

10. The fan assembly of claim 1, wherein the plurality of drive member contact zones are defined by a plurality of raised projections on the inner face of the fan hub.

11. The fan assembly of claim 1, wherein the plurality of clip contact zones are arranged symmetrically about the aperture of the fan hub, and wherein the plurality of drive member contact zones are arranged symmetrically about the aperture of the fan hub.

12. The fan assembly of claim 1, wherein the clip only applies the second pressure to the outer face of the fan hub at the plurality of discrete clip contact zones, and wherein the drive member only applies the first pressure to the inner face of the fan hub at the plurality of discrete drive member contact zones.

13. The fan assembly of claim 1, wherein the fan assembly is an automotive cooling fan assembly, the fan assembly further comprising a shroud including a shroud hub and a plurality of stationary blades that extend radially from the shroud hub, and wherein the motor is coupled to the shroud hub.

14. The fan assembly of claim 1, wherein each one of the plurality of clip contact zones is at least partially directly opposed to a respective one of the plurality of drive member contact zones.

15. A fan assembly comprising:
a motor including a drive shaft;
a fan including,
a fan hub having an aperture through which the drive shaft extends, an inner face that faces toward the motor, and an outer face that faces away from the motor, and
a plurality of fan blades that extend radially from the fan hub,
a drive member coupled to the drive shaft for rotation with the drive shaft, the drive member applying a first pressure to the inner face of the fan hub to inhibit movement of the fan along the drive shaft; and
a clip including,
a first radial edge,
a second radial edge, and
a groove at least partially defined between the first and the second radial edges, the groove receiving the drive shaft to engage the clip and the outer face of the fan hub to couple the fan to the drive shaft, the clip contacting the outer face of the fan hub to define a clip contact zone between the clip and the outer face of the fan hub, the clip applying a second pressure to the outer face of the fan hub at the clip contact zone to inhibit movement of the fan along the drive shaft, and
wherein there is no clip contact zone directly adjacent either one of the first radial edge and the second radial edge of the clip.

16. The fan assembly of claim 15, wherein there is no clip contact zone within about 25 degrees of either one of the first radial edge and the second radial edge of the clip.

17. The fan assembly of claim 15, wherein the clip contact zone is located adjacent an outer periphery of the clip, wherein the first and second radial edges extend to the outer periphery such that the groove defines an opening in the outer periphery.

18. The fan assembly of claim 15, wherein the clip contact zone is adjacent a recessed portion formed in the outer face of the fan hub.

19. The fan assembly of claim 15, wherein the clip contact zones includes a plurality of discrete clip contact zones between the clip and the outer face of the fan hub, wherein the drive member contacts the inner face of the fan hub to define a plurality of discrete drive member contact zones between the drive member and the inner face of the fan hub, the drive member applying the pressure to the inner face of the fan hub at the drive member contact zones, wherein the plurality of drive member contact zones are generally aligned with the plurality of clip contact zones.

20. The fan assembly of claim 19, wherein each one of the plurality of clip contact zones is directly opposed to a respective one of the plurality of drive member contact zones.

* * * * *

UNITED STATES PATENT AND TRADEMARK OFFICE
CERTIFICATE OF CORRECTION

PATENT NO.        : 8,152,484 B2
APPLICATION NO.   : 12/421205
DATED             : April 10, 2012
INVENTOR(S)       : Mark L. Bilodeau, Frederick R. Cote and Alex Czulak It is certified that error appears in the above-identified patent and that said Letters Patent is hereby corrected as shown below:

Column 7, line 10, claim 3:    delete the first instance of the word "three"

Column 7, line 12, claim 3:    add the word --three-- between the words "includes" and "discrete"

Column 8, line 53, claim 19:   add the word --first-- between the words "the" and "pressure"

Signed and Sealed this
Third Day of July, 2012

David J. Kappos
*Director of the United States Patent and Trademark Office*